United States Patent [19]

Seal

[11] Patent Number: 5,072,718
[45] Date of Patent: * Dec. 17, 1991

[54] CART ASSEMBLY FOR BARBECUE GRILLS

[75] Inventor: John Seal, Auburn, Ala.

[73] Assignee: W. C. Bradley Company, Columbus, Ga.

[*] Notice: The portion of the term of this patent subsequent to Sep. 11, 2007 has been disclaimed.

[21] Appl. No.: 554,661

[22] Filed: Jul. 17, 1990

Related U.S. Application Data

[63] Continuation-in-part of Ser. No. 392,790, Aug. 11, 1989, Pat. No. 4,955,358.

[51] Int. Cl.⁵ ............................................. F24C 3/00
[52] U.S. Cl. ............................. 126/41 R; 126/9 R; 126/25 R
[58] Field of Search ............... 126/25 R, 41 R, 9 R

[56] References Cited

U.S. PATENT DOCUMENTS

| | | | |
|---|---|---|---|
| 4,646,711 | 3/1987 | Oliphant | 126/9 R |
| 4,718,399 | 1/1988 | Shepherd | 126/25 R |
| 4,924,846 | 5/1990 | Peacock et al. | 126/41 R |
| 4,949,701 | 8/1990 | Krosp et al. | 126/41 R |
| 4,955,358 | 9/1990 | Harris et al. | 126/25 R |

Primary Examiner—Carroll B. Dority
Attorney, Agent, or Firm—Hopkins & Thomas

[57] ABSTRACT

A barbecue grill cart assembly is disclosed having a pair of leg assemblies each including a front leg, a rear leg and a connecting strut permanently securing the front and rear legs together. Connection of the assemblies to one another is accomplished with a bottom shelf, a control panel and the grill itself. The cart assembly is thus characterized by a small number of structural members while exhibiting a high degree of structural integrity.

8 Claims, 2 Drawing Sheets

CART ASSEMBLY FOR BARBECUE GRILLS

This application is a continuation-in-part of co-pending application Ser. No. 392,790, filed Aug. 11, 1989, now U.S. Pat. No. 4,953,358 and having a common assignee.

BACKGROUND OF THE INVENTION

Barbecue grill manufacturers commonly supply a wheeled cart with the barbecue grill for mounting the grill and for moving the grill from one location to another. The carts are packed in an unassembled state with the grill for convenience in shipping the product. Such carts, in general, have the grill mounted centrally thereon with the cooking surface located at approximately the waist-level of an adult. The cart may include front, side and/or bottom shelves and wheels or casters on two or four of the legs.

As a result of the elevated mounting of the grill, barbecue grill carts tend to be top heavy. Consequently, the carts must utilize multiple braces or similar means to ensure the stability of the cart. In general, braces are normally provided between the legs of the assembly, extending from front to back and from one side to the other, at both upper and lower regions of the legs. This multiplicity of braces, along with the corresponding fastening means, causes assembly of the cart to be relatively complex and time consuming. In addition, problems are encountered with supply and quality control due to the number of parts which must be supplied for cart assemblies.

A major improvement in cart design is taught by co-pending application Ser. No. 392,790 now U.S. Pat. No. 4,955,358. The number of braces was reduced substantially while increasing the rigidity of the assembly by providing interlocking of the braces and multiple contact points at each leg. It is to further improvement in cart design as well as to the solving of problems of the prior art with regard to the multiplicity of parts and relative difficulty of assembly that the present invention is directed.

SUMMARY OF THE INVENTION

It is, therefore, one of the principal objects of the present invention to provide a cart assembly for barbecue grills that has a very limited number of structural parts, while exhibiting superior stability.

Another object of the present invention is to provide a cart assembly for barbecue grills that is easily and quickly assembled by a consumer.

A further object of the present invention is to provide a cart assembly for barbecue grills that provides economies in manufacturing and in packaging and which is durable for providing a long service life.

These and other objects are attained by the present invention which relates to a cart assembly for barbecue grills that is generally rectangular in shape and normally includes wheels for mobility and an LP gas tank as a fuel source. The cart assembly includes right and left sets of leg means with a front and rear leg set being permanently fastened together to form a leg assembly, thus forming the sides of the cart assembly. Strut means are provided to connect the right and left sets of leg means at their lower ends. The cart assembly also includes a control panel to connect the right and left assemblies at their upper end and the grill casting itself serves as a structural element. Side, front, and bottom shelves may also be provided.

Various additional objects and advantages of the present invention will become apparent from the following detailed description, with reference to the accompanying drawings.

DETAILED DESCRIPTION OF THE PREFERRED EMBODIMENT

Figure 1:
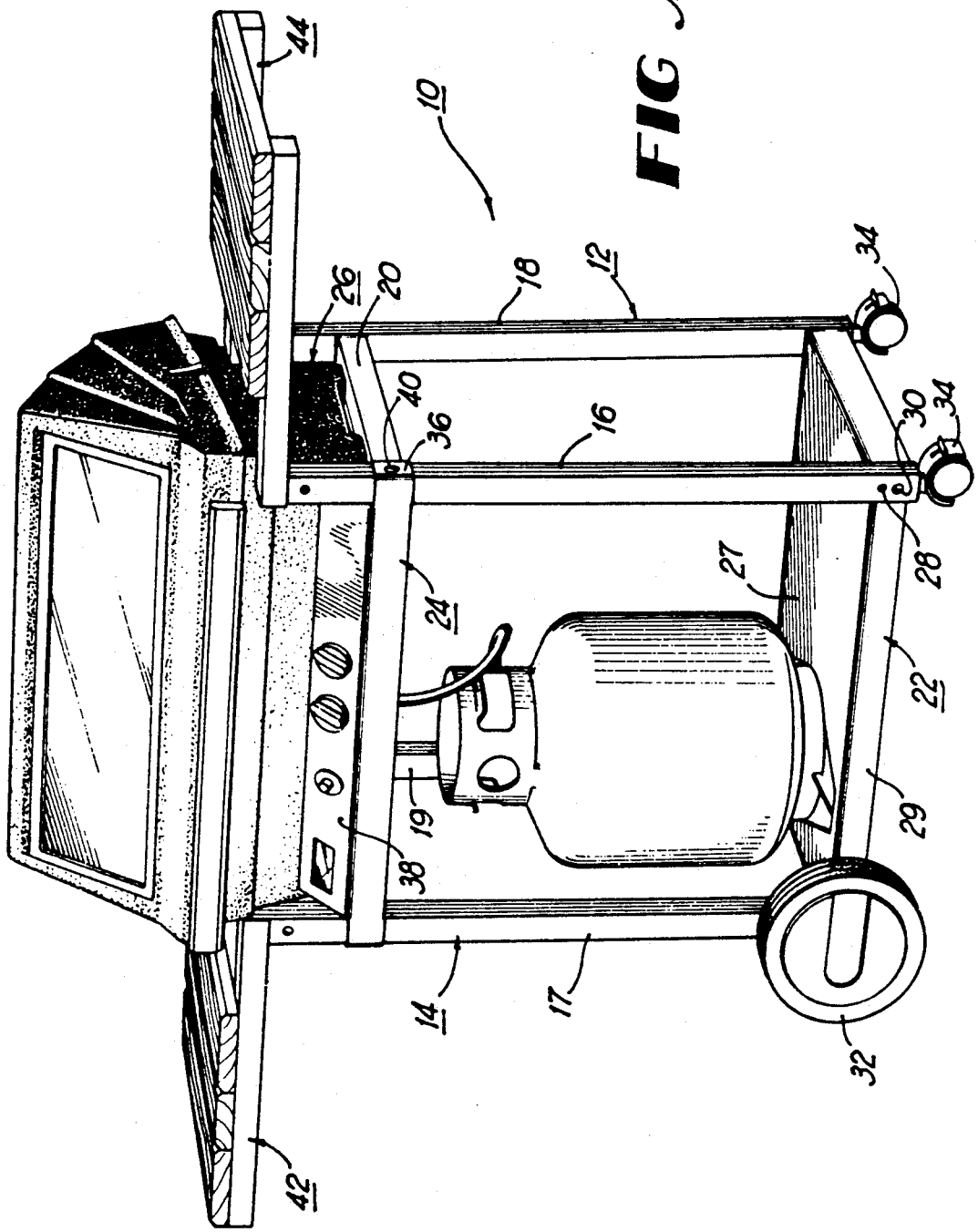
FIG. 1 is a perspective view of the present cart assembly, shown in assembled form with a barbecue grill mounted thereon.

Referring now more specifically to the drawings, and to FIG. 1 in particular, numeral 10 designates generally the present barbecue grill cart assembly. The cart is shown in assembled form with a barbecue grill mounted thereon and with wheels attached to each leg. The structural members of the cart will normally be fabricated from steel to provide the necessary strength and resistance to heat; however, other suitable materials having these qualities may also be utilized.

Figure 2:
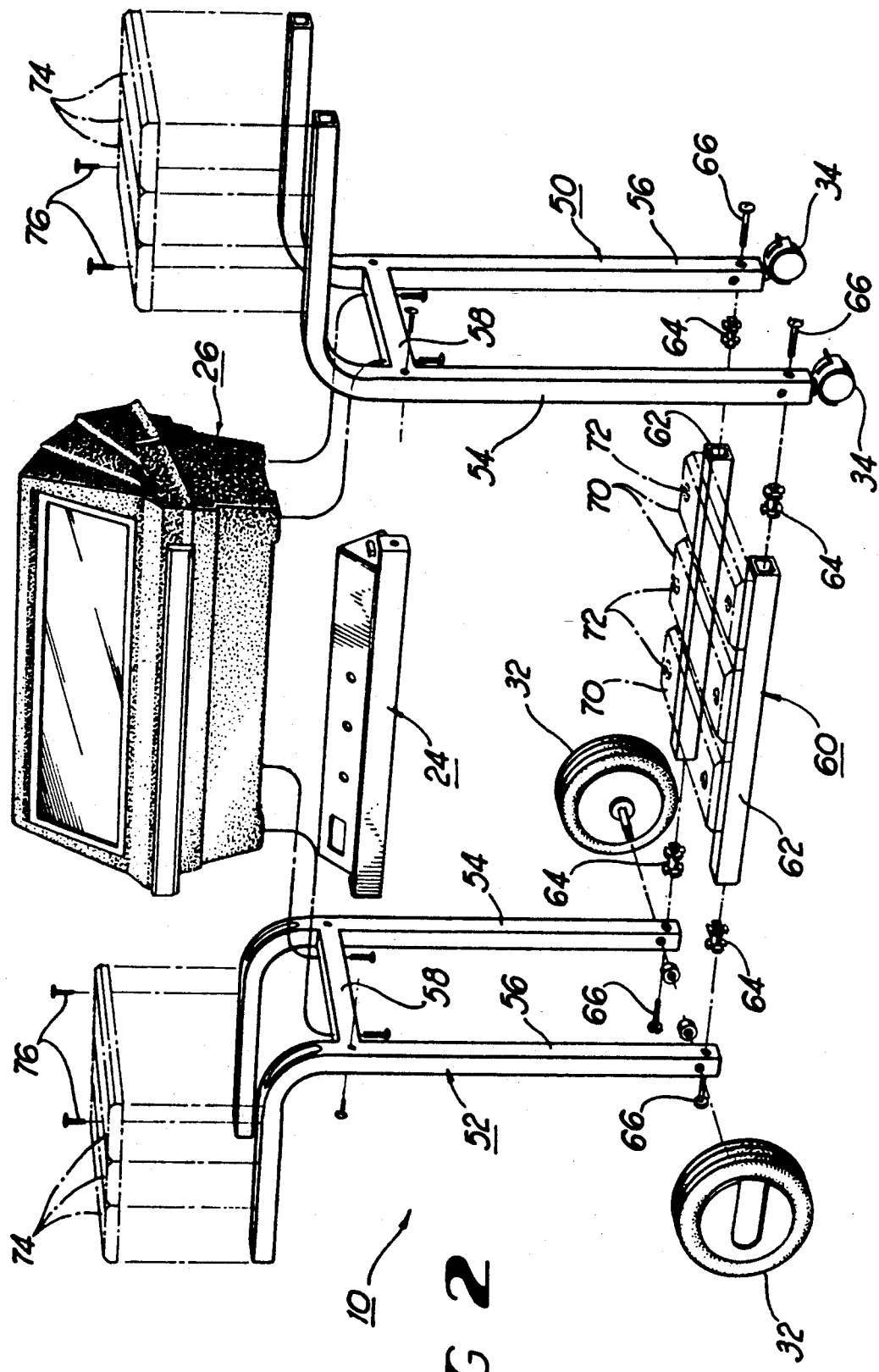
FIG. 2 is an exploded perspective view of an alternate embodiment of the present cart assembly.

FIGS. 1 and 2 illustrate two different versions of the present invention; however, the structure is essentially the same. The differences lie in the configuration of the side and bottom shelves which necessarily causes differences in the means of attaching the shelves to the legs or vice versa. The similarities and differences are explained in detail hereinbelow.

The present cart includes a right side leg assembly 12 and a left side leg assembly 14. Each leg assembly includes a front and rear leg and a connecting strut means extending therebetween. Thus, the right leg assembly 12 includes a front leg 16, a rear leg 18, and a connecting strut 20. The left side leg assembly includes a front leg 17, a rear leg 19 and a connecting strut 21. The connecting struts 20 and 21 are disposed perpendicular to and near the upper ends of the legs 16 and 18, and 17 and 19, respectively, and are fastened therebetween, preferably by welding. The struts between the front and rear legs may be secured thereto in other suitable ways; however, welding is preferred for its strength, structural integrity, and the fact that the combined front and rear leg sets are assembled during manufacture and prior to shipment. This provides economies in packaging the cart assembly as the packer need only make sure that there are two leg assemblies in the carton rather than four legs, eight braces, etc. In addition, since the barbecue grill and cart assembly are shipped in an unassembled condition, assembly by the consumer is greatly simplified.

In the embodiment shown in FIG. 1, the right and left side leg assemblies are secured to one another by a bottom shelf means 22, disposed perpendicularly thereto and near the lower ends of the leg assemblies in one plane, and by a control panel 24 and the grill 26, disposed near the upper end of the leg assemblies in a parallel plane. The bottom shelf is formed with a generally rectangular plate member 27 as an upper surface with a downwardly extending flange 29 extending therearound. The flange 29 includes holes with an extruded flange therearound (not shown), the flanges being received in corresponding holes 28 formed in each of the legs. The legs are secured to the shelf with bolts 30. At the left side of the cart, as viewed in FIG. 1, one of the holes receives the axle for the large wheels 32. At the right side of the cart, as viewed in FIG. 1, the legs receive casters 34, which are inserted into the legs from the bottom. This construction is described in co-pending application, Ser. No. 392,790, U.S. Pat. No. 4,955,358, having a common assignee. The relevant material from the co-pending application is incorporated herein by reference. The arrangement provides a locking connection at each lower corner, thus providing superior stability.

At the upper end of the leg assemblies, connection across the front is provided by control panel 24. The panel includes a laterally extending flange 36 on each side thereof. These flanges and the main body portion 38 of the control panel 24 define a recess therebetween for receiving the front legs. The control panel flanges are then secured to the legs with a suitable fastening means such as bolt 40 and a nut (not shown).

Further securement at the upper ends of the leg assemblies is provided by the barbecue grill casting 26 which rests on and is bolted to the struts 20 and 21, utilizing one or two bolts for each side. The bolts extend upwardly through the struts 20 and 21 and into the casting 26, where they are secured by a nut. The side shelves 42 and 44 are then secured to each side of the cart assembly, at the upper ends of the leg members. The shelves have an upright or operational position as shown, and a folded position which disposes the shelves parallel with the cart legs.

Referring now to FIG. 2, an alternate embodiment of the present cart assembly is illustrated in exploded form. The major differences between this embodiment and the previous embodiment involve the configuration and attachment means used for the bottom shelf and the side shelves. The cart includes a right side leg assembly 50 and a left side leg assembly 52. Each leg assembly includes a front leg 54 and a rear leg 56. Connecting the front and rear legs near the upper end thereof is a strut means 58, secured to each leg preferably by welding. The leg assemblies 50 and 52 are mirror images of one another and are thus interchangeable, further facilitating manufacture, packaging, and final assembly.

Connection of the right and left leg assemblies to one another is accomplished in one plane with the control panel 24 and the barbecue grill casting 26 and in a parallel plane by the bottom shelf means or assembly 60. The control panel and the grill casting are connected to the leg assemblies as described hereinabove. The bottom shelf assembly 60 includes a pair of tubular strut members 62, each of the members having flattened ends for abutting and fitting flush against the tubular leg members in perpendicular relationship thereto.

The tubular strut members are secured to the upright leg members with a suitable fastening means such as a butterfly nut 64 that is wedged into the open end of the strut member and which receives a bolt 66. An alternate securing method involves a plate member with a threaded bore (not shown) that is permanently secured inside the tubular strut member and which then receives a bolt. Further stability in the transverse direction relative to the tubular strut members is provided by the shelf members 70 which span the opposed tubular strut members 62 and are secured thereto, normally with screws 72. A similar arrangement is used for the side shelves, shelf members 74 being secured between the lateral extensions of the front and rear leg members with screws 76. The shelves may be formed with slats as shown, with a one piece solid member of wood, glass or other suitable material, or may be formed as wire grid.

The LP gas tank (not shown) is mounted on the bottom shelf assembly 60 in any suitable manner, such as with securing clips or other receiving means. The cart assembly may also include a front shelf, a front wire basket, or a front panel disposed between the front legs for concealing the gas tank.

It can thus be appreciated by those skilled in the art that a novel barbecue grill cart assembly and modifications thereof have been shown and described in detail herein. Various additional changes and modifications may be made without departing from the scope of the present invention.

I claim:

1. A barbecue grill cart assembly comprising a pair of generally vertical leg member assemblies each having a front leg and a rear leg with spaced, opposing, generally horizontal strut means connected to said front and rear leg members for providing a generally rectangular frame structure, said strut means having an upper surface for receiving a barbecue grill, and a bottom shelf assembly for connecting said leg member assemblies and having a pair of spaced opposing strut members, one of said strut members extending between said front legs and other of said strut members extending between said rear legs, shelf means extending between said strut members and being secured thereto, at least one side shelf having spaced opposing rails with slat means spanning said rails for forming a shelf, said rails each having a proximal end with upper and lower elongated slots and said leg members having upper and lower pins near the upper end thereof for engaging said slots and securing said shelf thereon, and securing means disposed through said strut members and said leg members for fastening said leg member assemblies together near the lower ends thereof.

2. A barbecue grill cart assembly as defined in claim 1 in which said assembly includes a front panel member having outwardly extending flange means for engaging said front leg members near the points of connection of said strut means, and including fastening means extending through said flange means of said front panel and said front leg members for fastening said leg member assemblies together near the upper ends thereof.

3. A barbecue grill cart assembly as defined in claim 1 in which said assembly includes a second side shelf disposed on the side opposite said first mentioned shelf, said shelves having a raised and locked horizontal position and a lowered vertical position, said shelves being disengaged from said horizontal position by lifting said proximal ends.

4. A barbecue grill cart assembly as defined in claim 1 in which said strut means between each front and rear legs are permanently attached thereto in perpendicular relationship, by welding said strut means to said legs.

5. A barbecue grill cart assembly for receiving a barbecue grill comprising a pair of leg assemblies, each of said assemblies having a front leg and a rear leg, a strut means for each of said leg assemblies, said strut means being permanently attached to a front leg and a rear leg for forming respectively said leg assemblies, a shelf means extending between said leg assemblies in perpendicular relation to said strut means and being secured to said assemblies for connecting said leg assemblies together in a first plane, and a control panel extending between said front legs for securing said leg assemblies together in a second plane parallel to said first plane.

6. A barbecue grill cart assembly as defined in claim 5 in which said shelf means includes a pair of tubular strut members, one of said strut members extending between and secured to said front legs and the other of said strut members extending between and secured to said rear legs such that said strut members are disposed parallel to one another in spaced relationship, and a shelf secured to and extending between said strut members.

7. A barbecue grill cart assembly as defined in claim 5 in which said shelf means comprises a rectangular plate having a downwardly extending flange portion disposed therearound and parallel to said leg members, said leg members having at least one aperture formed therein and said flange portion having at least one corresponding aperture for each of said apertures in said leg members, said apertures in said flange portion having a circular flange therearound for engaging said apertures in said leg members for preventing twisting or racking of said leg members and securing means disposed through said apertures for fastening said shelf means to said leg members.

8. A barbecue grill cart assembly for receiving a barbecue grill comprising a pair of leg assemblies, each of said assemblies having a front leg and a rear leg, a strut means for each of said leg assemblies, said strut means being permanently attached to a front leg and a rear leg for forming respectively said leg assemblies, a shelf means extending between said leg assemblies in perpendicular relation to said strut means and being secured to said assemblies for connecting said leg assemblies together in a first plane, said shelf means comprising a rectangular plate having a downwardly extending flange portion disposed therearound and parallel to said leg members, said leg members having at least one aperture formed therein and said flange portion having at least one corresponding aperture for each of said apertures in said leg members, said apertures in said flange portion having a circular flange therearound for engaging said apertures in said leg members for preventing twisting or racking of said leg members and securing means disposed through said apertures for fastening said shelf means to said leg members and a control panel extending between said front legs for securing said leg assemblies together in a second plane parallel to said first plane.

* * * * *